United States Patent [19]

Morita et al.

[11] Patent Number: 4,607,386
[45] Date of Patent: Aug. 19, 1986

[54] HANDWRITTEN CHARACTER RECOGNITION DEVICE

[75] Inventors: Toshiaki Morita; Masahiro Horii; Shigeru Tasaka, all of Nara; Hitoshi Hirose, Yamatokoriyama, all of Japan

[73] Assignee: Sharp Kabushiki Kaisha, Osaka, Japan

[21] Appl. No.: 657,196

[22] Filed: Oct. 3, 1984

[30] Foreign Application Priority Data

Oct. 6, 1983 [JP] Japan ................................. 58-187243

[51] Int. Cl.[4] ............................................. G06K 9/46
[52] U.S. Cl. ........................................ 382/13; 382/23; 382/24
[58] Field of Search ...................... 382/13, 23, 24, 54, 382/59

[56] References Cited

U.S. PATENT DOCUMENTS 4,284,975  8/1981  Odaka ................................. 382/13
4,317,109  2/1982  Odaka et al. ....................... 382/13

FOREIGN PATENT DOCUMENTS 0035674  3/1983  Japan ................................. 382/13

Primary Examiner—Leo H. Boudreau
Assistant Examiner—Jacqueline Todd
Attorney, Agent, or Firm—Birch, Stewart, Kolasch & Birch

[57] ABSTRACT

A handwritten character recognition device comprises a feature point circuit for recognizing a character with using three feature points for a continuous stroke connecting a first stroke and second strokes. For recognition, both stroke information and stroke connection information between adjacent strokes are read-in per stroke. Therefore, the character can be recognized with a relative position correlation between the stroke number and the stroke shape. Even if the stroke number may be irregularly changed, the inputted character can be recognized without a necessity of storing information for the irregularly changed strokes.

2 Claims, 9 Drawing Figures

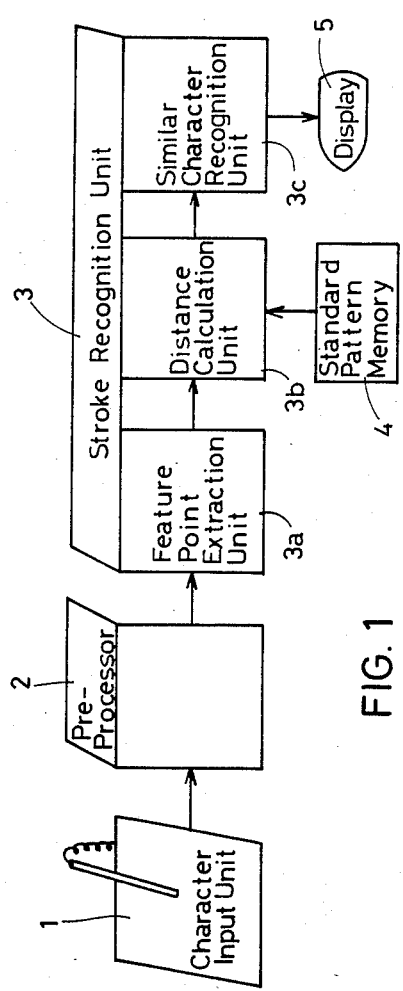
FIG. 1
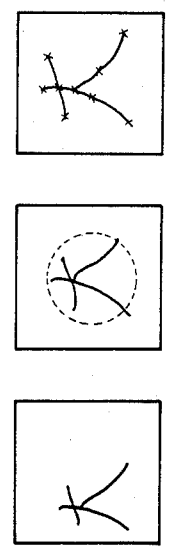
FIG.2(A) FIG.2(B) FIG.2(C)
FIG.2(D)

FIG. 3(A)
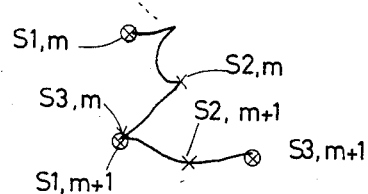
FIG. 3(B)
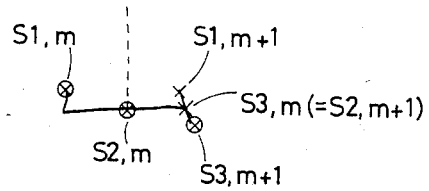
FIG. 3(C)
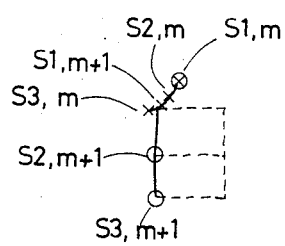
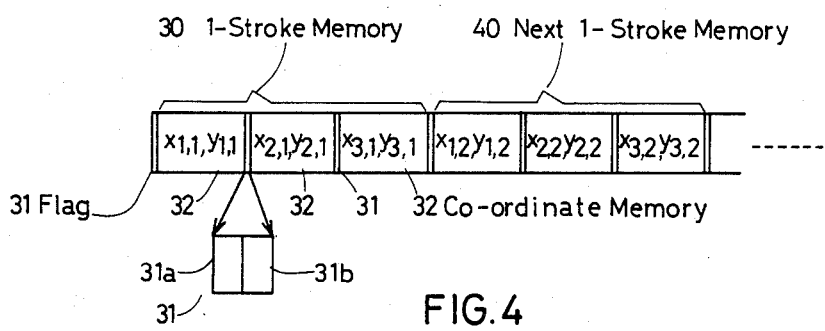
FIG. 4

HANDWRITTEN CHARACTER RECOGNITION DEVICE

BACKGROUND OF THE INVENTION

The present invention relates to a handwritten character recognition device and, more particularly, to a feature point recognition circuit for a handwritten character recognition device.

Conventionally, handwritten character recognition devices, including those for recognizing a Chinese character utilize a feature point recognition circuit for recognizing feature points in the character with a plurality of strokes and comparing those features with a standard pattern. The stroke number of the character must correctly correspond to the stroke shape. Therefore, the stroke number of the character inputted may be incorrectly recognized if the strokes of the character are irregularly handwritten, so that a plurality of strokes appears to a single stroke.

It may be assumed that a great number of variations of the stroke numbers are stored in a memory as a standard character pattern. However, the number of the variations are too vast to store all of the variations in a limited memory capacity.

SUMMARY OF THE INVENTION

Accordingly, it is an object of the present invention to provide an improved handwritten character recognition device for recognizing an inputted character by detecting per stroke both stroke information and stroke connection information between strokes, so that the character can be recognized with a relative position correlation between the stroke number and the stroke shape.

It is another object of the present invention to provide an improved handwritten character recognition device utilizing an improved feature point recognition circuit for recognizing a continuous stroke combining a first and second strokes. The remaining continuous stroke being represented by three feature points as the remaining discrete strokes, so that the character can be recognized with a relative position correlation between the stroke number and the stroke shape.

Briefly described, in accordance with the present invention, a handwritten character recognition device includes input means for inputting information of a character by hand-writing some strokes of a character, extracting means for extracting a starting point, an intermediate point, and an end point of each of the strokes as feature points, memory means for storing standard patterns of a plurality of characters, comparison means for comparing the inputted feature points and the standard patterns, detection means for detecting the lengths of the respective strokes and selecting the three feature points, and identifying means for identifying the inputted character.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a block diagram of a handwritten character recognition device according to the present invention;

FIGS. 2(A) through 2(D) are examples of recognizing a Chinese character by the recognition device of FIG. 1;

FIGS. 3(A) through 3(C) are drawings showing the relationship between strokes and feature points according to the present invention; and FIG. 4 is a storage format of a standard pattern memory storing a plurality of standard patterns for the present invention.

DESCRIPTION OF THE INVENTION

FIG. 1 is a block diagram of a handwritten character recognition device according to the present invention.

The recognition device includes a character input unit 1, a pre-processor 2, a stroke recognition unit 3, a standard pattern memory 4, and a display 5. The stroke recognition unit 3 further includes a feature point extraction unit 3a, a distance calculation unit 3b, and a similar character recognition unit 3c.

The character unit 1 is operated to input co-ordinate data of a contact point of a pen. The character inputted into unit 1 is transferred into the pre-processor 2 so that the position and the size of the character are normalized, interpolated, smoothed, and subjected in order to sampling to form a pre-processed pattern. The pattern is introduced into the feature point extraction unit 3a so that the feature points of the respective strokes are extracted. Each stroke is approximated with three feature points. These feature points correspond to a starting point, an intermediate point, and an end point, respectively. The starting point is a point from which the stroke is begun. The intermediate point is a half point of the full length of the measured stroke. The end point is an ending point at which the stroke is completed. Therefore, the character constructed by "n" strokes is represented by "3n" feature points.

The standard pattern memory 4 is provided as a dictionary for storing standard patterns of feature points for a number of characters by approximating each stroke with three feature points. Based upon the comparison of the inputted feature points and the feature points of the standard patterns, the distance calculation unit 3b calculates the following distance D(theta) between the patterns:

$$D(\text{theta}) = \sum_{i=1}^{M} \| P_i - P_i^{theta} \|$$

The elements of the distance calculation are as follows:

Theta: Category to be recognized;
$P_i$: i-th feature point of the inputted pattern;
$P_i^{theta}$: i-th feature point of a standard pattern belonging to a category "theta"
M: the sum of the feature points of both the inputted pattern and the standard pattern, in which "n" is assumed to be the stroke number, so that M=3n;
$\| A - B \|$ : an amount, for example, Euclidean Norm, representative of the distance between a first written point A and a second written point B of a pen The similar character recognition unit 3c is operated to discriminate and select based upon the inputted pattern of the character a similar pattern character where a minimum distance exists between the respective feature points. Thereafter, the pattern character selected is forwarded into the display 5.

FIGS. 2(A) through 2(D) are examples of recognizing a Chinese character.

An inputted character is shown in FIG. 2(A). This inputted pattern is pre-processed to form the pattern as shown in FIG. 2(B). The character feature points as denoted by "x" are extracted as shown in FIG. 2(C). FIG. 2(D) represent a table showing standard patterns and categories as stored within the standard pattern memory 4. Based upon the inputted character's feature points, a specific category is selected from the categories of FIG. 2(D).

The present invention improves the storage format of the standard pattern memory 4 to reduce the required number of standard patterns necesary for character recognition. The standard patterns stored are such that stroke connection information is stored in a flag 31 (as will be described later) in connection with some stroke to be possibly written as being continued. The standard patterns are to be compared with the inputted character patterns.

FIGS. 3(A) through 3(C) are examples of extracting the feature points according to the present invention. FIG. 4 is a schematic view of the storage format of the memory.

The stroke is approximated with three feature points, including a starting point, intermediate point, and end point. The following three coordinates (X, Y) are given as representative of a single stroke:

Starting point: (x1, y1)
Intermediate point: (x2, y2)
End point: (x3, y3)

If a character is composed of "N" strokes, (N: a positive integer), a standard pattern of "N" strokes should be stored. If two strokes, an m-th stroke and an (m+1)-th stroke, are written incorrectly with a single stroke, the total strokes are calculated to be "N-1" strokes, so that the recognition device must be permitted to assume the standard pattern of the character to be "N".

A method for converting the two discrete strokes into a single stroke in the inputted pattern according to the present invention will be described as follows.

For illustration, an m-th stroke is represented as Sm and an (m+1)-th stroke is represented as S(m+1). The co-ordinates of the feature points on the strokes Sm and S(m+1) are as shown in the following TABLE I. |Sm| and |S(m+1)| indicate the respective lengths of the strokes Sm and S(m+1).

TABLE I

| Stroke | Starting Point | Intermediate Point | End Point |
|---|---|---|---|
| Sm | $(x1_{(m)}, y1_{(m)})$ | $(x2_{(m)}, y2_{(m)})$ | $(x3_{(m)}, y3_{(m)})$ |
| S(m+1) | $(x1_{(m+1)}, y1_{(m+1)})$ | $(x2_{(m+1)}, y2_{(m+1)})$ | $(x3_{(m+1)}, y3_{(m+1)})$ |

(i) When $|Sm| \approx |S(m+1)|$

The following feature points are selected as those of the continuing strokes:
Starting Point: $(x1_{(m)}, y1_{(m+1)})$
Intermediate Point: $(x1_{(m+1)}, y1_{(m+1)})$
End point: $(x3_{(m+1)}, y3_{(m+1)})$ (ii) When $|Sm| >> |S(m+1)|$ The following feature points are selected as those of the continuing strokes:
Starting Point: $(x1_{(m)}, u1_{(m)})$
Intermediate Point: $(x2_{(m)}, y2(m))$
End Point: $(x3_{(m+1)}, y3_{(m+1)})$ (iii) When $|Sm| << |S(m+1)|$ The following feature points are selected as those of the continuing strokes:
Starting Point: $(x1_{(m)}, y1_{(m)})$
Intermediate Point: $(x2_{(m+1)}, y2_{(m+1)})$
End Point: $(x3_{(m+1)}, y3_{(m+1)})$ Thus, by comparing the lengths of the two strokes, the intermediate point of the longer stroke is adopted as the intermediate point of the feature point to be processed. When the lengths of the two adjacent strokes are substantially equal to each other, the intermediate point of the latter stroke is adopted as the intermediate point of the feature point. The conditions of (i) through (iii) are shown in FIGS. 3(A) through 3(C), respectively. In these drawings, the co-ordinates of the starting point, the intermediate point, and the end point are represented simply as follows: S1,m, S2,m, S3,m and S1,m+1, S2,m+1, S3,m+1, respectively In FIGS. 3(A) through 3(C), "x" is a feature point and ⓧ is a feature point to be selected.

According to the present invention, even when two strokes appear as a single stroke, the co-ordinates of the feature points can be correctly measured and the character recognition function performed.

FIG. 4 is a storage format of the standard pattern memory 4.

The standard pattern is entered into a memory including a 1-stroke memory 30 and a second 1-stroke memory 40, each including three flags 31 and co-ordinate memories 32. In the described embodiment, the flag 31 is 2 bits and the co-ordinate memories 32 are of 2 bytes of memory storage. Each flag 31 is positioned before each co-ordinate memory 32.

The respective co-ordinate memories 32 store the co-ordinates of the starting point (x1,1, y1,1), the intermediate point (x2,1, y2,1), and the end point (x3,1 y3,1) of each standard character. As stated above, the flag 31 is provided for storing stroke connection information between the strokes which are possibly to be written as being combined. The flag 31 is constructed by an upper bit location 31a, and a lower bit location 31b each storing the following data:

TABLE II

| 31a | 31b | Connected Condition |
|---|---|---|
| 0 | 0 | The strokes are not continued. |
| 0 | 1 | The former and latter strokes have the same length as shown in FIG. 3(A) |
| 1 | 0 | The former stroke is longer than the latter stroke as shown in FIG. 3(B) |
| 1 | 1 | The former stroke is shorter than the latter stroke as shown in FIG. 3 (C) |

The respective number of strokes creating the inputted pattern and the standard pattern are compared. If they are equal, the feature points of the respective strokes are compared. When the stroke number of the inputted pattern is less than the stroke number of the standard pattern, it is assumed and detected that at least two strokes are written as being combined. In the latter case, the stroke comparison is again achieved by considering the stroke connection information as stored in the flag 31.

The 1-stroke memory 30 is followed by the next 1-stroke memory 40. The memory 40 includes the memories 32 respectively storing the co-ordinate of the starting point (x1,2, y1,2), the intermediate point (x2,2, y2,2), and the end point (x,3,2, y3,2). Based upon the detection of which stroke of the inputted character is longer, specific data is selected from the stored data of FIG. 4 as the feature points to be compared.

For example in the above description, it is assumed that two strokes of a Chinese character are written as continued and represent a single stroke. It may be evident that a character recognition device of the present invention can recognize a Chinese character with three or more strokes written as a continuous single stroke.

Further, it may be obvious that any other characters except for the Chinese characters can be recognized in the above-described character recognition device.

While only certain embodiments of the present invention have been described, it will be apparent to those skilled in the art that various changes and modifications may be made therein without departing from the spirit and scope of the present invention as claimed.

What is claimed is:

1. A handwritten character recognition device comprising:

input means for inputting information of a character by handwriting strokes of the character;

extracting means responsive to said input means for extracting a starting point, an intermediate point, and an end point of each of said strokes as feature points;

memory means for storing a plurality of standard patterns of characters together with stroke connection information, wherein said memory means further comprises co-ordinate memory means for storing co-ordinate information for said feature points, and signal memory means responsive to said co-ordinate memory means for storing information representative of whether a plurality of strokes of a given character are continuously connected;

comparison means responsive to said extracting means for comparing the inputted feature points with the standard patterns; detection means for detecting the lengths of the respective strokes and selecting the three feature points by using the stroke connection information in said memory means, said detection means including means for comparing the lengths of the respective strokes and detecting a longer stroke between two adjacent strokes, and feature point modification means for selecting an intermediate point of the longer stroke as the intermediate of the feature point to be compared thereby combining a plurality of continuously connected strokes; and identifying means responsive to said comparison means and said detection means for identifying the inputted character.

2. The device of claim 1, wherein said co-ordinate memory means contains the starting point, the intermediate point, and the end point of each stroke.

* * * * *